(12) United States Patent
Bernier et al.

(10) Patent No.: US 6,313,981 B1
(45) Date of Patent: Nov. 6, 2001

(54) BUS BAR CONNECTION ASSEMBLY (75) Inventors: Richard E. Bernier; Gilbert A. Soares, both of Mebane, NC (US); Subrahmanyam Thota, Hyderabad (IN); Peter D. Muse, Durham, NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/451,991

(22) Filed: Nov. 30, 1999

(51) Int. Cl.⁷ ....................................................... H02B 5/00
(52) U.S. Cl. ...................... 361/639; 24/336; 174/40 CC; 361/809
(58) Field of Search ............................ 29/832, 837, 842; 248/205.1; 174/40 CC, 71 B, 88 B, 99 B; 439/82, 620, 845; 24/335, 336, 338; 361/611, 624, 637, 639, 648, 807, 809, 825

(56) References Cited

U.S. PATENT DOCUMENTS

| | | | |
|---|---|---|---|
| 3,295,806 | * | 1/1967 | Modeme . |
| 3,656,183 | * | 4/1972 | Walterscheid ......................... 439/73 |
| 5,311,649 | * | 5/1994 | Suh ....................................... 24/625 |
| 5,772,471 | * | 6/1998 | Buck .................................... 439/607 |
| 6,011,218 | * | 1/2000 | Burek et al. ..................... 174/40 CC |
| 6,040,525 | * | 3/2000 | Chauquet et al. .............. 174/40 CC |

* cited by examiner

*Primary Examiner*—Gerald Tolin
(74) *Attorney, Agent, or Firm*—Cantor Colburn LLP; Carl B. Horton (57) ABSTRACT

A securement assembly for providing securement of a member to a surface within an electrical distribution center. The assembly includes a first mounting member and a retaining member. The first mounting member is secured within an opening in the surface and the member is retained within the first mounting member by the retaining member which is positioned over the member and the first mounting member.

23 Claims, 12 Drawing Sheets

BUS BAR CONNECTION ASSEMBLY

BACKGROUND OF THE INVENTION

The present invention relates generally to bus bars, and more particularly to a bus bar connection assembly in motor control centers.

Motor control centers are commonly employed for performing various protection and control functions in industrial settings. Electric power is fed from the electric power distribution mains into the motor control center. The power is further distributed to various drawers or buckets. The drawers or buckets contain devices such as one or more circuit breakers, starters, overload protectors, or pilot devices. The devices are electrically connected with horizontal and vertical main bus conductors via intermediate electrically-insulated distribution bus conductors.

A common ground bus is typically provided within the cabinet, and the buckets containing electrical components interface with that common ground. Ground bus bars are secured to the cabinet, for example, with various hardware, welding techniques, or a combination thereof. The attachment strength of a common ground bus is particularly important when a plurality of buckets are repeatedly inserted and withdrawn.

SUMMARY OF THE INVENTION

A securement assembly for securing an elongated member such as a bus bar to a surface. The securement assembly up comprises a plurality of mounting members. The plurality of mounting members are configured to be engaged within a plurality of openings in the surface and provide a receiving area for the elongated member. A plurality of retaining members are configured to engage the elongated member within the receiving areas of the mounting members.

A method of securing an elongated member such as a bus bar to a surface wherein a plurality of mounting members are configured to be inserted and engaged in a plurality of openings in the surface. The mounting members provide a receiving area for the bus bar and a plurality of retaining clips retain the bus bar within the receiving area by inserting a pair of retaining members through an opening in the bus bar and the elongated member.

DESCRIPTION OF THE PREFERRED EMBODIMENT

Figure 1:
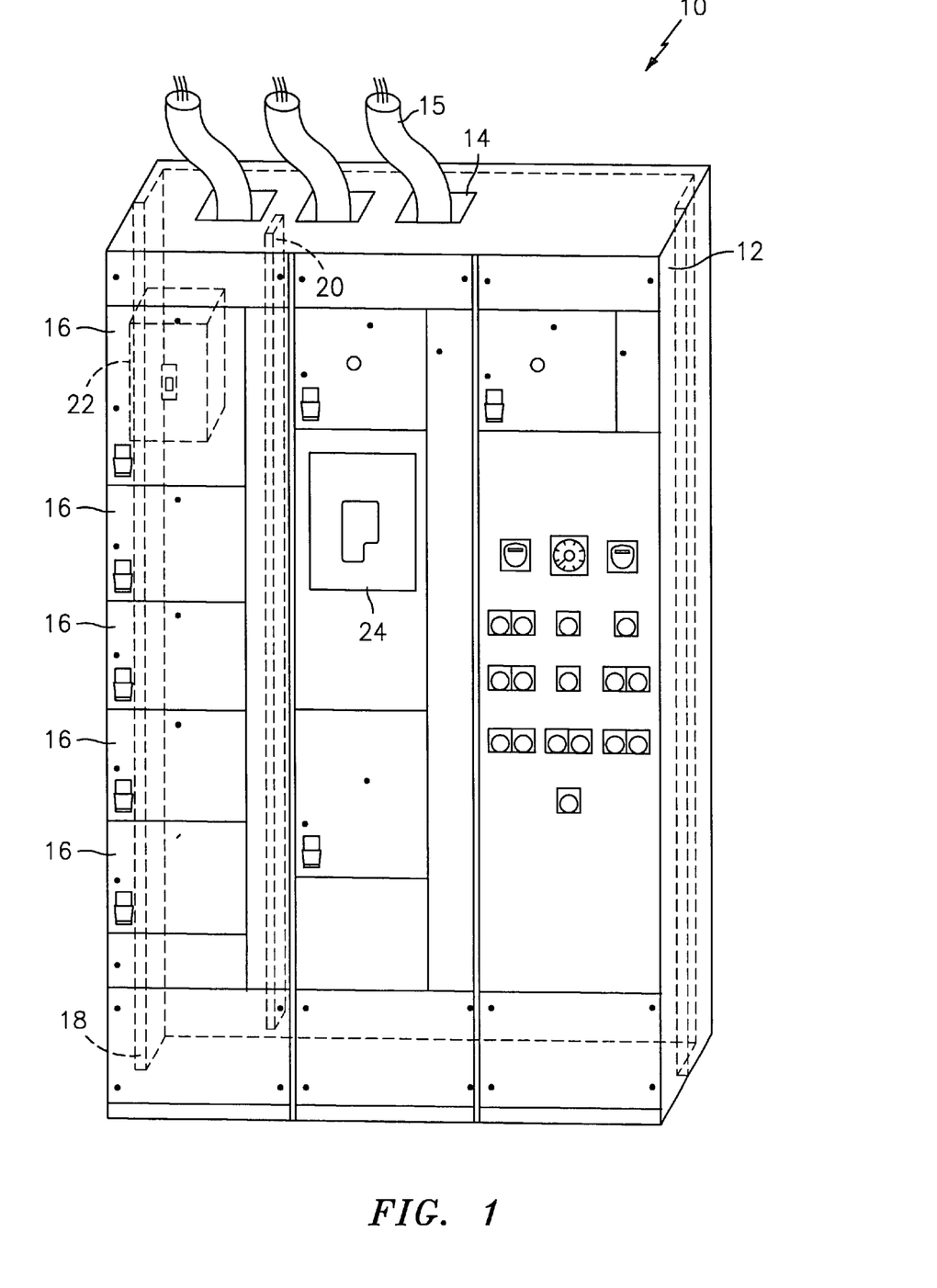
FIG. 1 is a front perspective view of a motor control center employing the bus bar connection assembly of the present invention.

In an exemplary embodiment of the invention and referring now FIG. 1, a motor control center 10 is illustrated. An enclosure cabinet 12 includes openings 14 to accept incoming power cables 15. A plurality of drawers or buckets 16 are also included within cabinet 12. Buckets 16 contain various electrical components such as one or more circuit breakers, starters, overload protectors, or pilot devices. A wing plate 18 (shown by phantom lines) is vertically disposed at the rear portion of cabinet 12. Wing plate 18 can be disposed across the entire rear portion of cabinet 12 or a portion thereof.

Horizontal or vertical main bus conductors (not shown) and a conductive ground bus bar 20 (shown by phantom lines) are located within cabinet 12. Ground bus bar 20 generally provides a common ground connection for a plurality of buckets 16. Internal electrical components are generally protected by one or more circuit breakers 22. Motor control center 10 generally provides control and communication between internal electrical components and the external electrical distribution system, including corresponding electrical motors via a control unit 24.

Figure 2:
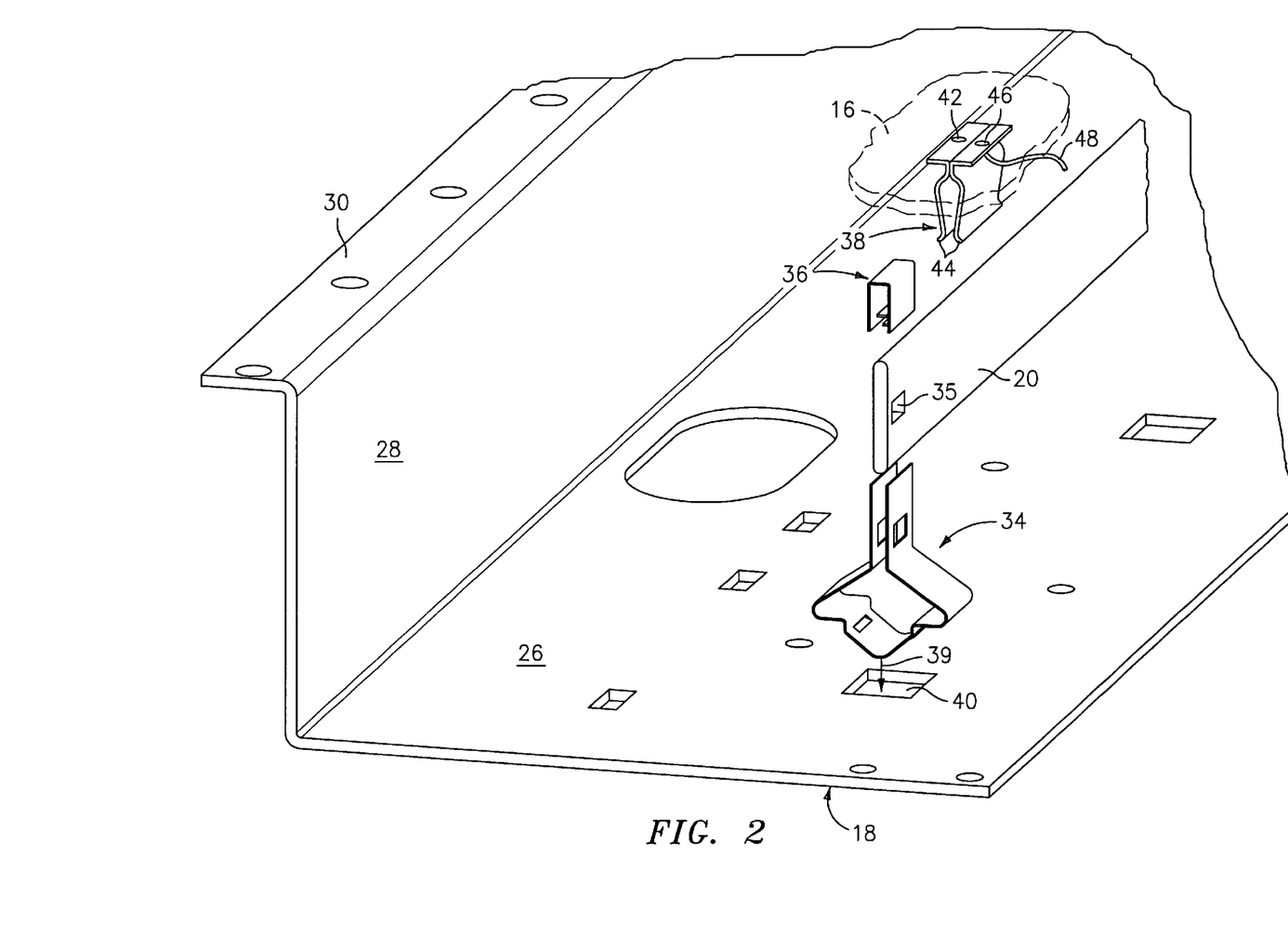
FIG. 2 is an exploded front perspective view of a connection assembly in accordance with the instant application.
Figure 3:
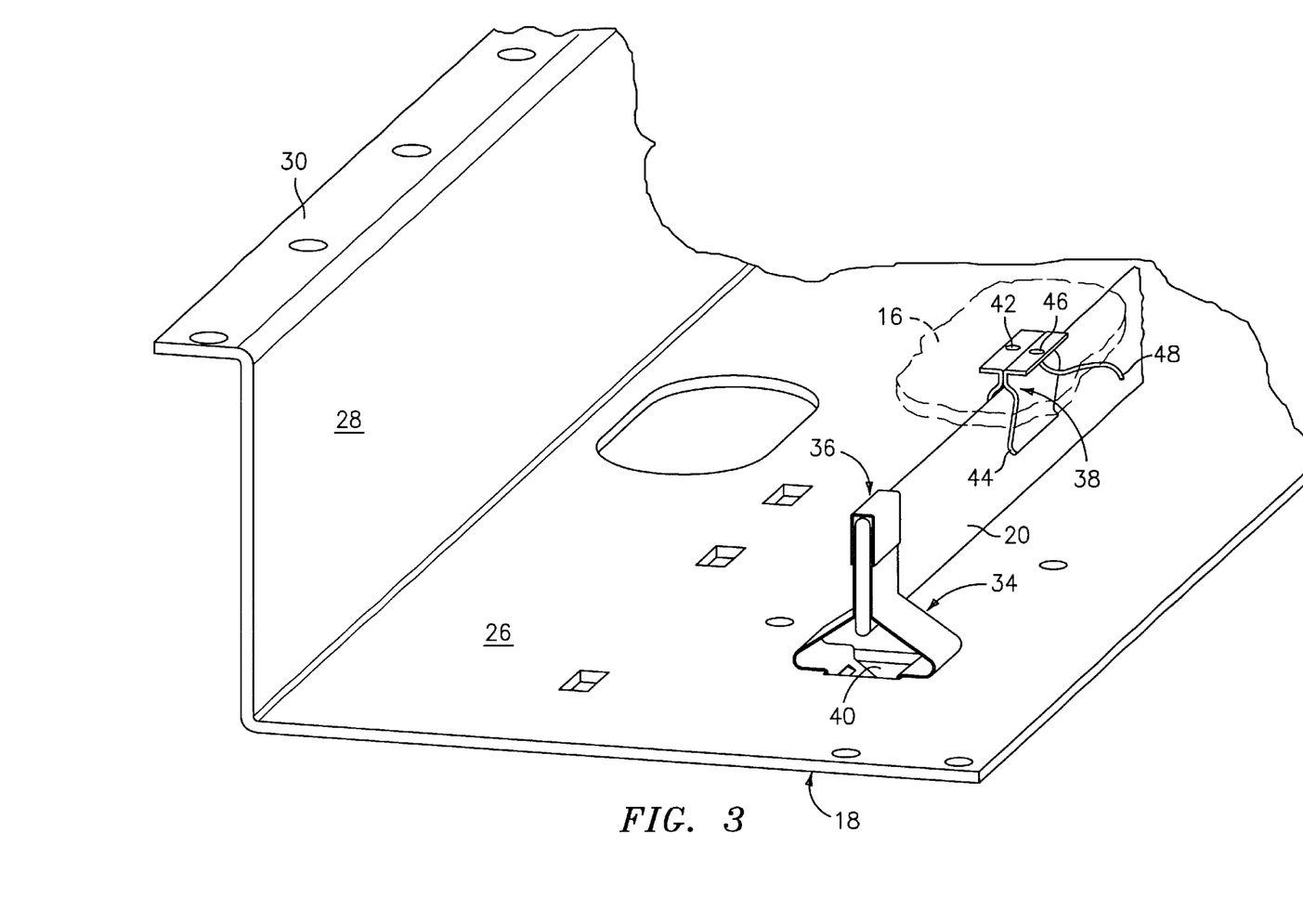
FIG. 3 is a front perspective view of a connection assembly.

Referring now to FIGS. 2–3 and in accordance with an exemplary embodiment of the invention, the mounting of ground bus bar 20 to wing plate 18 is illustrated. Wing plate 18 has a first planar member 26 and a second planar member 28. Second planar member 28 has a shoulder 30 depending therefrom for attachment to cabinet 12. Horizontal or vertical main bus conductors (not shown) and ground bus bar 20 are secured to planar member 26 of wing plate 18. It will be appreciated by one skilled in the art that the specific configuration of wing plate 18 and the various buses thereon may differ depending on the specific design needs.

Ground bus bar 20 is secured to planar member 26 by a plurality of mounting members or surface mount clips 34 and a corresponding plurality of retaining members or retaining clips 36. A bucket interface clip 38 allows bucket 16 (shown by phantom lines in FIGS. 2 and 3) to be mounted and interface with ground bus bar 20.

A portion of each surface mount clip 34 is engaged within each of a plurality of openings 40. Openings 40 are positioned so that ground bus bar 20 generally traverses a desired portion of the height of wing plate 18, so that one or more buckets 16 may be secured to ground bus bar 20 through bucket interface clips 38. Alternatively, openings 40 may be positioned to give ground bus bar 20 a horizontal or other configuration.

Generally, one bucket interface clip 38 is attached to each bucket 16 by a fastening means such as a bolt and nut at hole 42. Bucket interface clip 38 has fingers 44 that interface with ground bus bar 20 via a removable engagement such as a friction fit. Additionally, bucket interface clip 38 includes a lug 46 having a ground wire 48 attached thereto.

Figure 4:
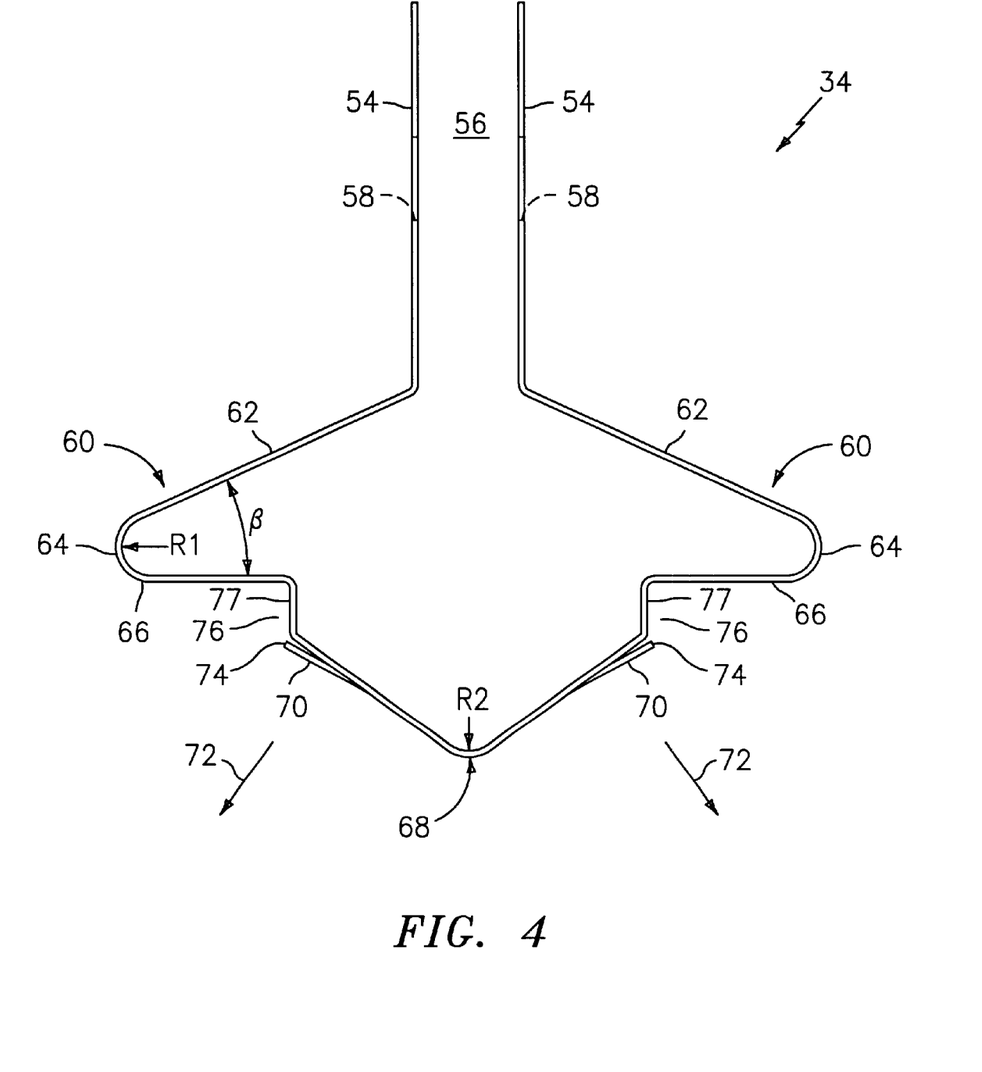
FIG. 4 is a front elevation view of components parts of the connection assembly.
Figure 5:
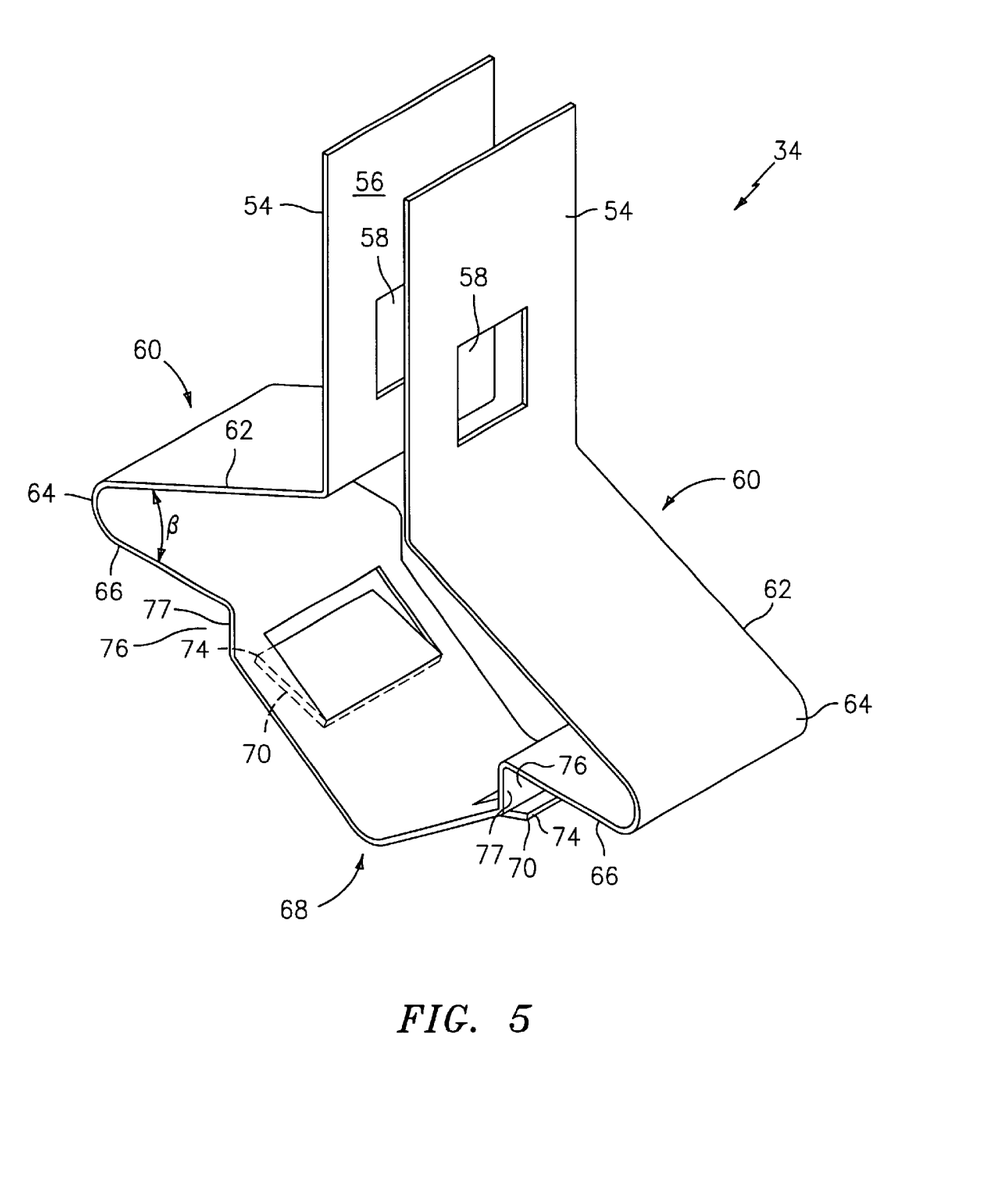
FIG. 5 is a front perspective view of a surface mount of FIG. 4.

Referring now to FIGS. 4 and 5, surface mount clip 34 is illustrated. In an exemplary embodiment, surface mount clip 34 is constructed of stainless steel. Flexibility is imparted to surface mount clip 34 by virtue of the relatively thin dimension of the stainless steel member. In alternative embodiments, other conducting materials (such as aluminum, copper, tin, etc.), or non-conducting or insulating materials (such as high strength polymers, wood, paper laminates, other laminates, etc.) may be used to fabricate surface mount clip 34. It will be understood by those skilled in the art that the materials of construction may differ according to particular needs.

Surface mount clip 34 has a pair of planar members 54 which are in facially spaced relationship as to define a receiving area 56. Receiving area 56 is sufficiently large enough so that a ground bus bar 20 can be inserted therein (FIGS. 2 and 3). Receiving area 56 is slightly smaller than the thickness of ground bus bar 20, such that a snug fit may be effectuated between planar members 54 and ground bus bar 20. Moreover, the flexible nature of surface mount clip 34 allows for ease of insertion of ground bus bar 20 into receiving area 56.

Figure 9:
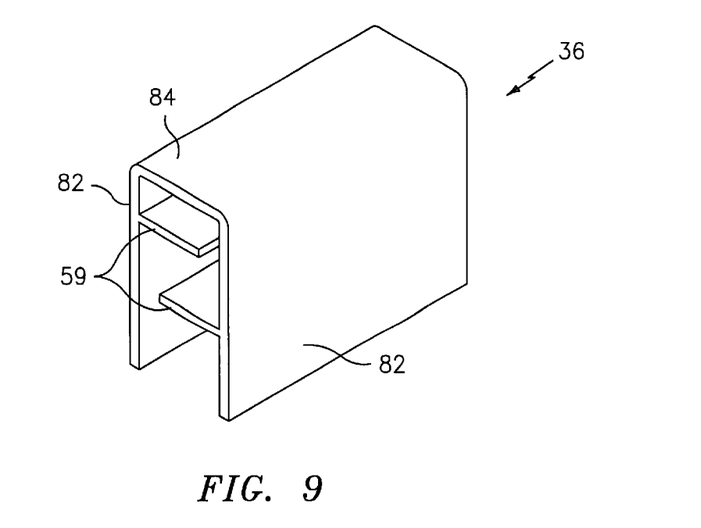
FIG. 9 is a top perspective view of a retaining member of the connection assembly.
Figure 10:
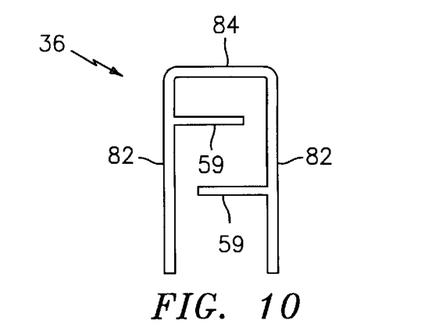
FIG. 10 is a front elevation view of the retaining member of the connection assembly.

Still referring to FIGS. 4 and 5, and also referring to FIGS. 9 and 10, planar members 54 each have a lock aperture 58 for receiving a restraining tab 59 of retaining clip 36. Furthermore, planar members 54 depend from a pair of support members 60. Each support member 60 has a sloped portion 62, an arcuate portion 64 (having a radius R1), and a seat portion 66 (which contacts the planar member 26 when surface mount clip 34 is inserted within an aperture 40). The angle B is also indicated between sloped portion 62 and seat portion 66.

Surface mount clip 34 is also configured to include an insertion portion 68. Insertion portion 68 is generally conical in shape and includes a pair of retaining tabs 70. Retaining tabs 70 are positioned to depend outwardly from the surface of insertion portion 68. Each retaining tab 70 includes an end portion 74. Retaining tabs 70 are stamped out of insertion portion 68 and are angularly displaced to provide a bias generally in the direction of arrows 72. In an exemplary embodiment, retaining tabs 70 are angularly displaced about 10° relative to the surface of insertion portion 68 to provide upward bias in the direction of arrows 72. Of course, it is contemplated that retaining tabs 70 may be displaced and angles greater than or less than 10°. Furthermore, it is contemplated that the size and configuration of retaining tabs 70 may vary. For example, retaining tabs 70 may be separate members depending from insertion portion 68.

A pair of receiving areas 76 defined generally by seat 66, insertion portion 68 and tabs 70 are configured to receive planar member 26. A portion of receiving area 76 is defined by surfaces 77. Surfaces 77 are each roughly the same size as the thickness of member 26. As surface mount clip 34 is inserted into opening 40 (FIGS. 6–7), the positioning of retaining tabs 70, and in particular end portions 74 of retaining tabs 70, define a portion of receiving areas 76.

In an exemplary embodiment of the instant application, ground bus bar 20 is about 6.35 millimeters (0.25 inches) thick, 25.4 millimeters (1 inch) high and of varying length (depending on the enclosure height and the ground bus bar requirements), and planar member 26 is approximately 2.30 millimeters (0.09 inches) thick having rectangular openings 40 that are 15.88 millimeters (0.625 inches) long by 19.56 millimeters (0.77 inches) wide. Correspondingly, the width of surface mount clip 34 is about 19.56 millimeters (0.77 inches), the distance between the outermost points of seat portions 66 is about 26.72 millimeters (1.052 inches), the radius R1 of arcuate portion 64 is about 1.93 millimeters (0.79 inches), the angle B is about 10°, the distance between planar members 54 is about 4.16 millimeters (0.164 inches), the thickness of the stainless steel for surface mount clip 34 is approximately 0.38 millimeters (0.015 inches), the base length of insertion portion 68 in the relaxed state (and correspondingly the distance between surfaces 77) is approximately 15.88 millimeters (0.625 inches), the distance between ends 76 of retaining tabs 70 is about 16.51 millimeters (0.65 inches), the overall height of surface mount clip 34 is approximately 39.85 millimeters (1.569 inches), the height of insertion portion 68 is approximately 5.79 millimeters (0.228 inches), the radius R2 of the tip of insertion portion 68 is approximately 2.97 millimeters (0.117 inches), the length of each tab 70 is approximately 3.18 mm (0.125 inches), and the heights of engaging portions 74 are about 2.41 millimeters (0.095 inches). Of course, it is contemplated in accordance with the instant application that these dimensions may vary significantly. Such variations may depend on a multitude of factors, including but not limited to the following, the dimensions and configurations of the ground bus bar 20 and wing plate 18, and the chosen materials of construction, as well as the intended use.

Referring now to FIGS. 2–7, the insertion of surface mount clip 34 into openings 40 (which may be an opening upon any planar surface including but not limited to planar member 26 of wing plate 18) is illustrated. As an urging force, in the direction of arrow 39, is applied to surface mount clip 34 insertion portion 68 passes through openings 40 until retaining tabs 70 are engaged by the inner surface of opening 40. Once the urging force in the direction of arrow 39 causes the bias of retaining tabs 70 to be overcome retaining tabs 70 are urged toward the surface of insertion portion 68 so that insertion portion 68 can bypass the inner surfaces of opening 40. Once retaining tabs 70 are completely passed through opening 40 the biasing forces of retaining tabs 70 cause retaining tabs 70 to move in the direction of arrow 72. This causes ends 74 to make contact with the underside of planar member 26 and seat portion 66 will contact of the top surface of planar member 26. Retaining tabs 70 are now once again angularly displaced from the surface of insertion portion 68. In this configuration, surface mount clip 34 is fixedly engaged to planar member 26.

Figure 6:
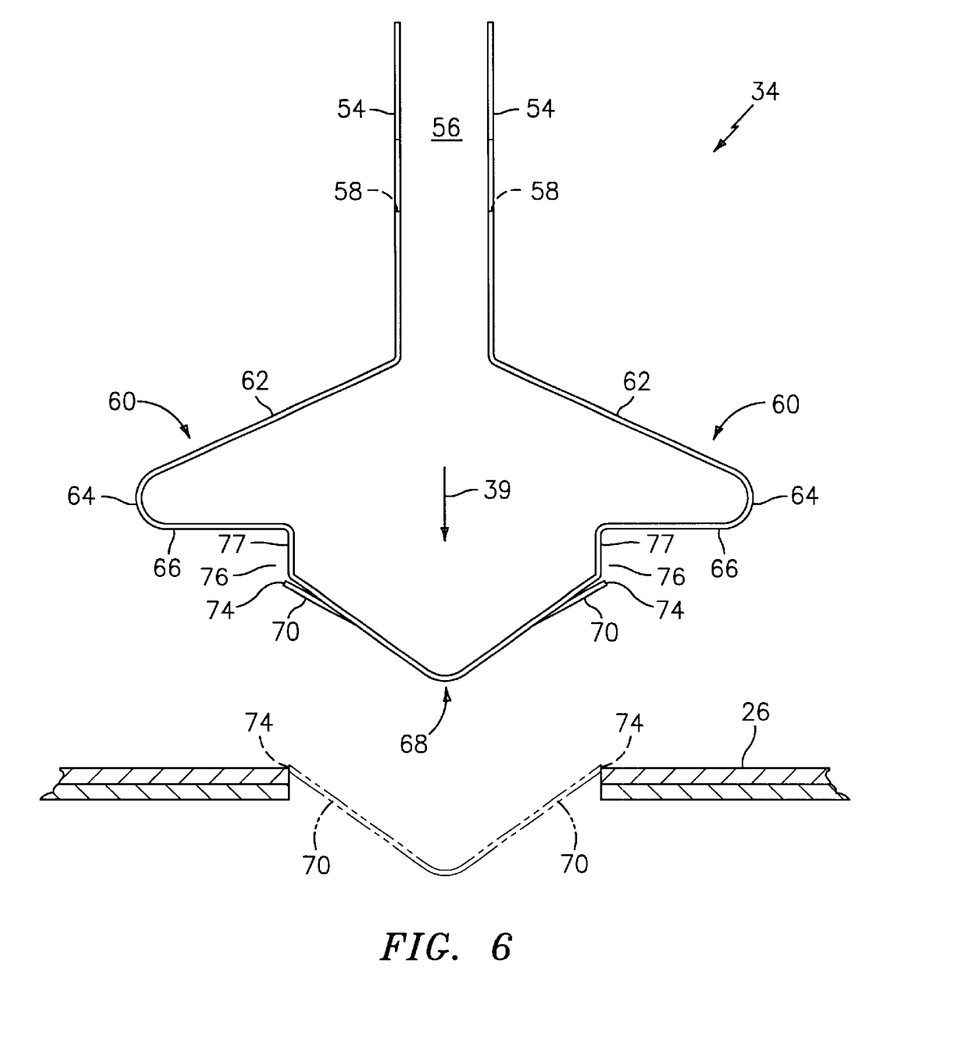
FIG. 6 is a front elevation view illustrating the insertion of the connection assembly into a planar surface.
Figure 7:
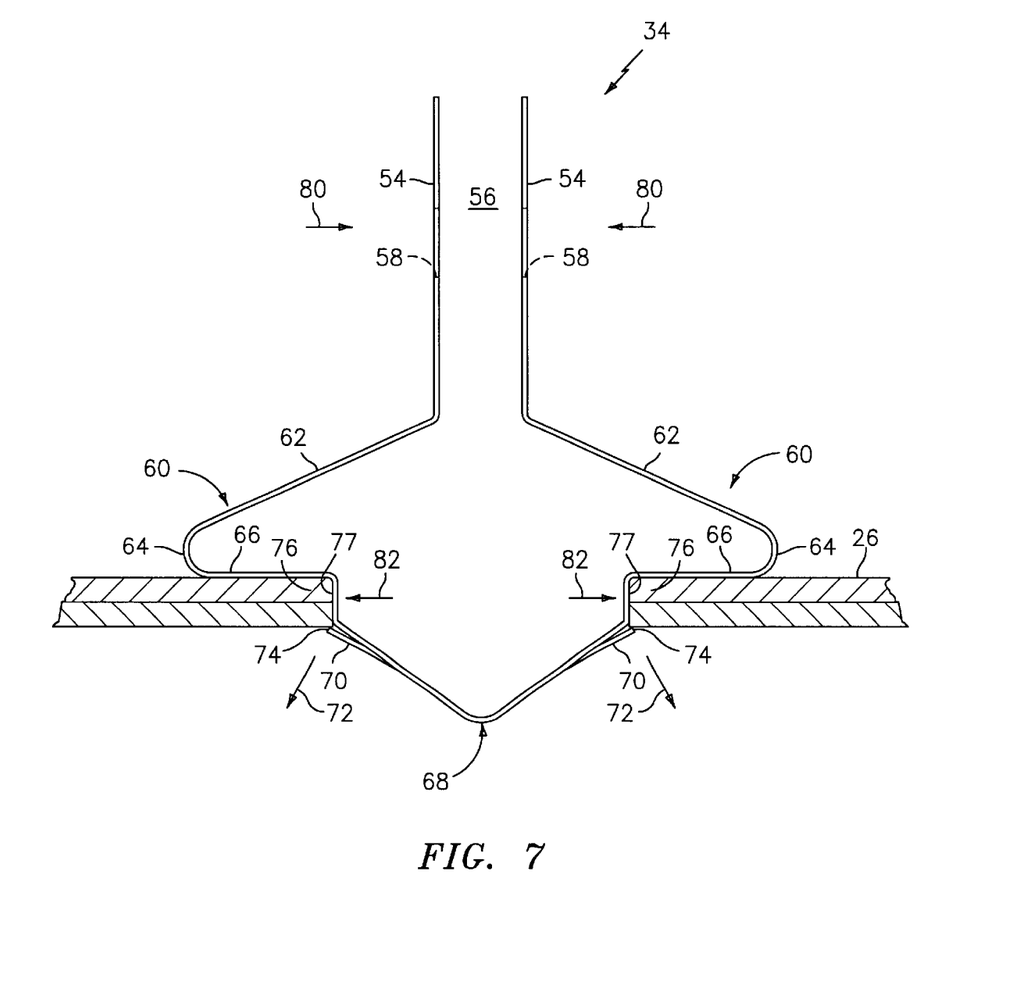
FIG. 7 is a front elevation view of the connection assembly inserted into a planar surface.

The biasing of retaining tabs 70, generally in the direction indicated by arrows 72, causes end portions 74 of retaining tabs 70 to engage the underside of planar member 26 proximate to the edges of openings 40. In this configuration, surface mount clip 34 is fixedly engaged to planar member 26 by retaining tabs 70.

A structural base for surface mount clip 34 relative to planar member 26 is provided by seat portions 66. When surface mount clip 34 is inserted through opening 40 to the point where seat portions 66 are in contact with planar member 26, additional movement is prevented. Furthermore, if lateral forces are imparted upon surface mount clip 34, for example as indicated by either arrow 80, seat portions 66 prevent surface mount clip 34 from toppling over and disengaging from opening 40 The positioning of surfaces 77 cause surfaces 77 to be spaced apart a distance approximately equal to the size of opening 40, as to effectuate a frictional engagement between surfaces 77 and the inner surfaces of opening 40.

Alternatively, and as applications require, surfaces 77 can be spaced apart a distance marginally smaller than the size of opening 40. This configuration will allow surface mount clip 34 to be inserted into openings 40 when, due to manufacturing standards, the size of opening 40 may vary slightly.

Furthermore, and as yet another alternative, surfaces 77 can be spaced apart a distance larger than the size of opening 40, as to effectuate a frictional engagement or friction fit between surfaces 77 and the inner surfaces of opening 70.

Insertion portion 68 provides an outward bias, as indicated by arrows 82. The outward bias is generated from the shape of insertion portion 68. Therefore, the amount of outward bias can vary depending on the dimensions and the shape of insertion portion 68. In this configuration, and when surfaces 77 engage planar member 26, the securement of surface mount clip 34 is provided in part by the frictional engagement between surfaces 77 and the inner surface of opening 40.

As provided herein, surface mount clips 34 may be inserted in planar member 26 of wing plate 18 without the need for assembly hardware such as screws or other fasteners. The insertion of surface mount clip 34 requires only downward force in the direction of arrow 39. This force may be provided by an individual's hand or other mechanical means. Furthermore, assembly costs may be decreased because surface mount clip 34 may be effectively secured to planar member 26 without soldering or welding. These features are of particular importance because assembly costs and time may be decreased. Moreover, in situations where bucket 16 is dimensioned as to make it impractical for conventional mounting means, surface mount clip 34 is particularly useful.

Referring now to FIGS. 2–8, the insertion of ground bus bar 20 in between planar members 54 of surface mount clip 34 is illustrated. Planar members 54 are spaced apart sufficiently to allow ground bus bar 20 to be snugly fitted therebetween. Furthermore, a holding force may be provided to ground bus bar 20 by support members 60. Varying dimensions of each support member 60 generally determine the extent of the holding force, if any.

Figure 8:
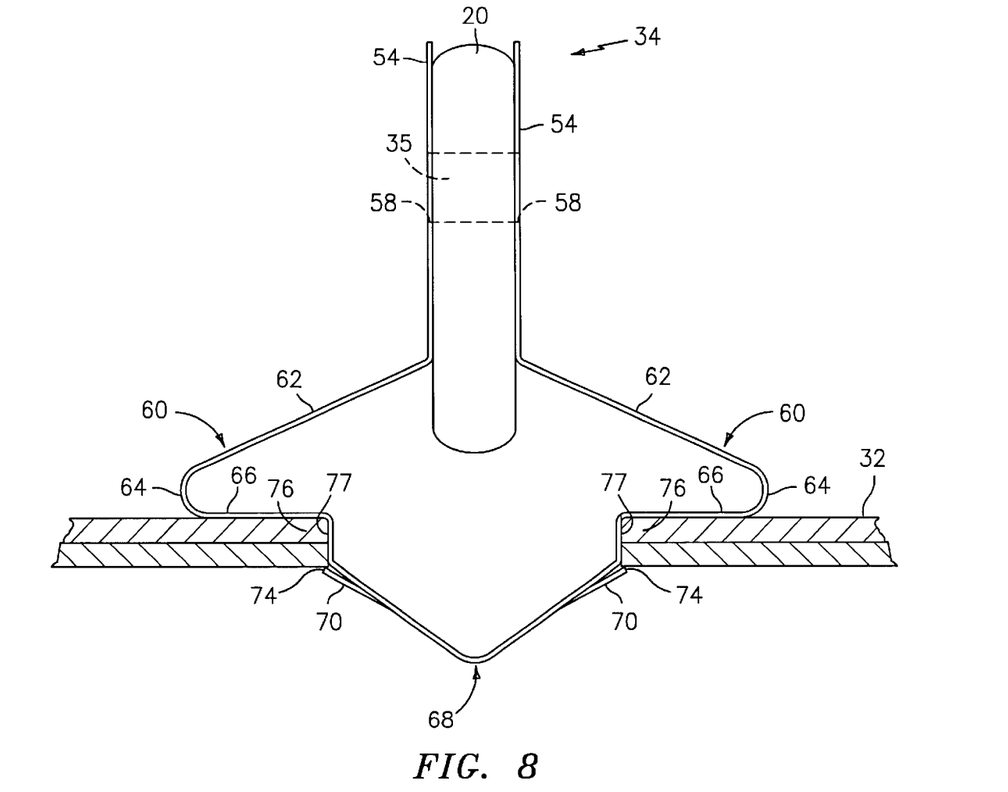
FIG. 8 is a front elevation view of the ground bus bar inserted into the connection assembly.

Ground bus bar 20 is inserted between planar members 54 so that an aperture 35 of ground bus bar 20 aligns with lock apertures 58 of planar members 54. Ground bus bar 20 is supported between planar members 54 such that the bottom edge of ground bus bar 20 is 6.35 millimeters (0.25 inches) from the top surface of planar member 26. However, it is contemplated that ground bus bar 20 may be supported between planar members 54 such that the bottom edge of ground bus bar 20 is in contact with the top surface of planar member 26, or such that the bottom edge of ground bus bar 20 is greater than 6.35 millimeters (0.25 inches) from the top surface of planar member 26. The positioning of ground bus bar 20 may vary according to the specific needs of the application.

Once inserted into surface mount clip 34, ground bus bar 20 is secured therein by retaining clip 36. Referring now to FIGS. 9 and 10, retaining clip 36 is illustrated. Each retaining clip 36 is configured to have a pair of sidewalls 82 which are in a facially spaced relationship and depend downwardly from top portion 84. Each sidewall 82 has a locking member or restraining tab 59 depending inwardly from sidewalls 82 in an offset manner. Retaining clip 36 is generally constructed of the same or similar material as surface mount clip 34 having flexible characteristics and is sized to correspond to surface mount 34.

Figure 11:
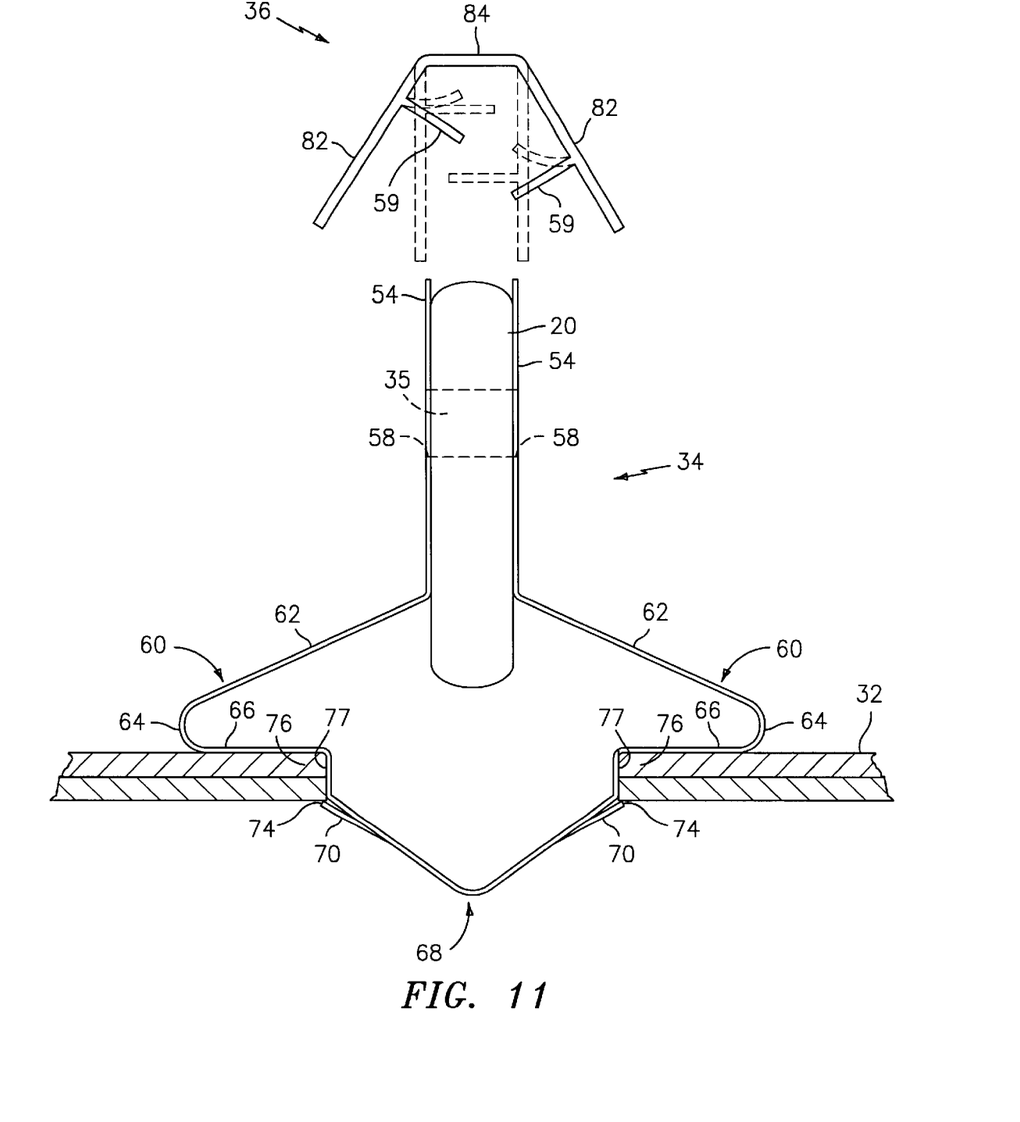
FIG. 11 is a front elevation view of the retaining member being mounted to the connection assembly.
Figure 12:
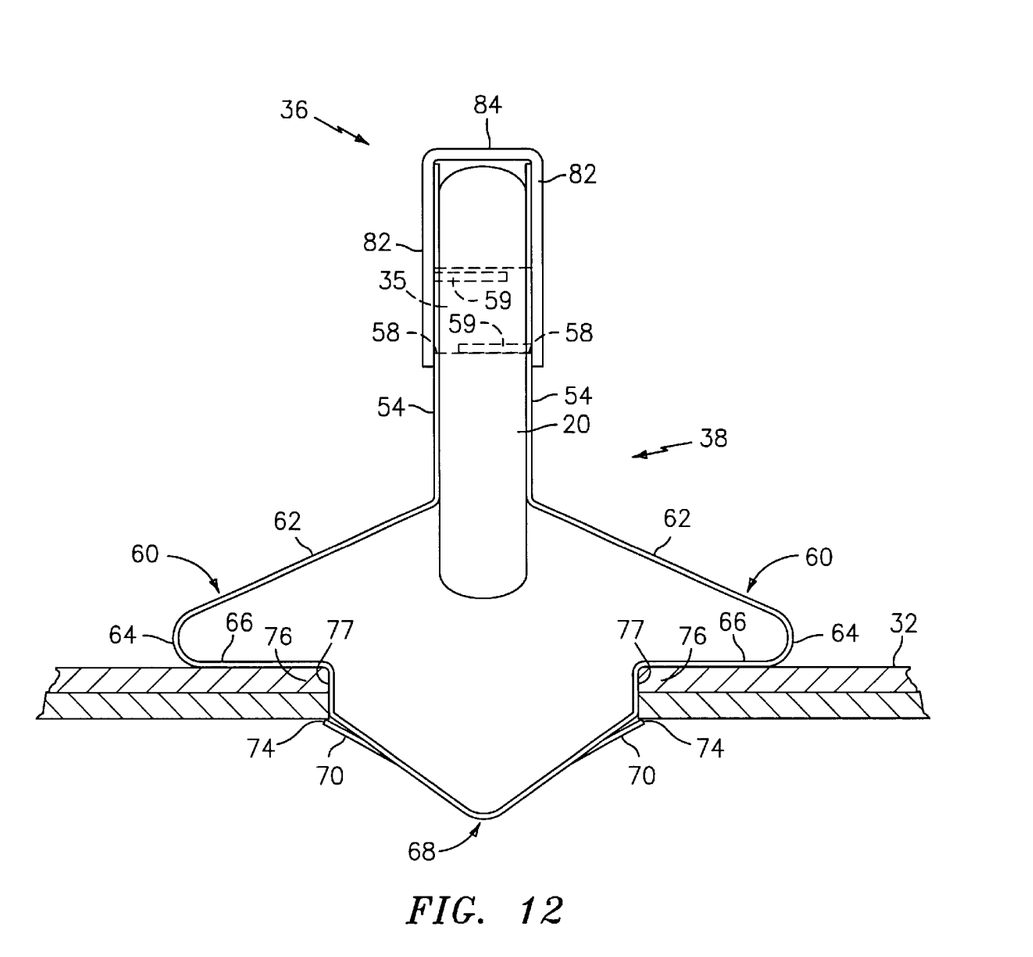
FIG. 12 is a front elevation view of the connection assembly including the retaining member inserted thereon.

Referring now to FIGS. 11 and 12, the securement of retaining clip 36 upon surface mount clip 34 is illustrated. In FIG. 11, retaining clip 36 is shown being outwardly deformed (the original relaxed shape shown by phantom lines) to allow retaining clip 36 (including restraining tabs 59) to be placed over planar members 54 of surface mount clip 34 having ground bus bar 20 inserted therebetween. Retaining clip 36 is outwardly deformed such that enough clearance is provided to fit over planar members 54. The outward deformation may be effectuated by an individual's hand or by other mechanical means.

In addition, restraining tabs 59 themselves may also be deflected (as shown by the dashed lines in FIG. 11) in order to secure retaining clip 36 to ground bus bar 20 and surface mount clip 34. Such deformation may be caused by hand or mechanical manipulation or frictional engagement of restraining tabs 59 on the surface of planar members 54.

When retaining clip 36 is positioned so that restraining tabs 59 are aligned with lock apertures 58, the outward deformation is released and retaining clip 36 reforms. In this configuration, and due to the position of restraining tabs 59, one restraining tab 59 engages the upper portion of a lock aperture 58 and aperture 35, and the other restraining tab 59 engages the lower portion of the other lock aperture 58 and aperture 35. Accordingly, ground bus bar 20 is fixedly secured to surface mount clip 34, and is precluded from movement.

Figures 13, 14:
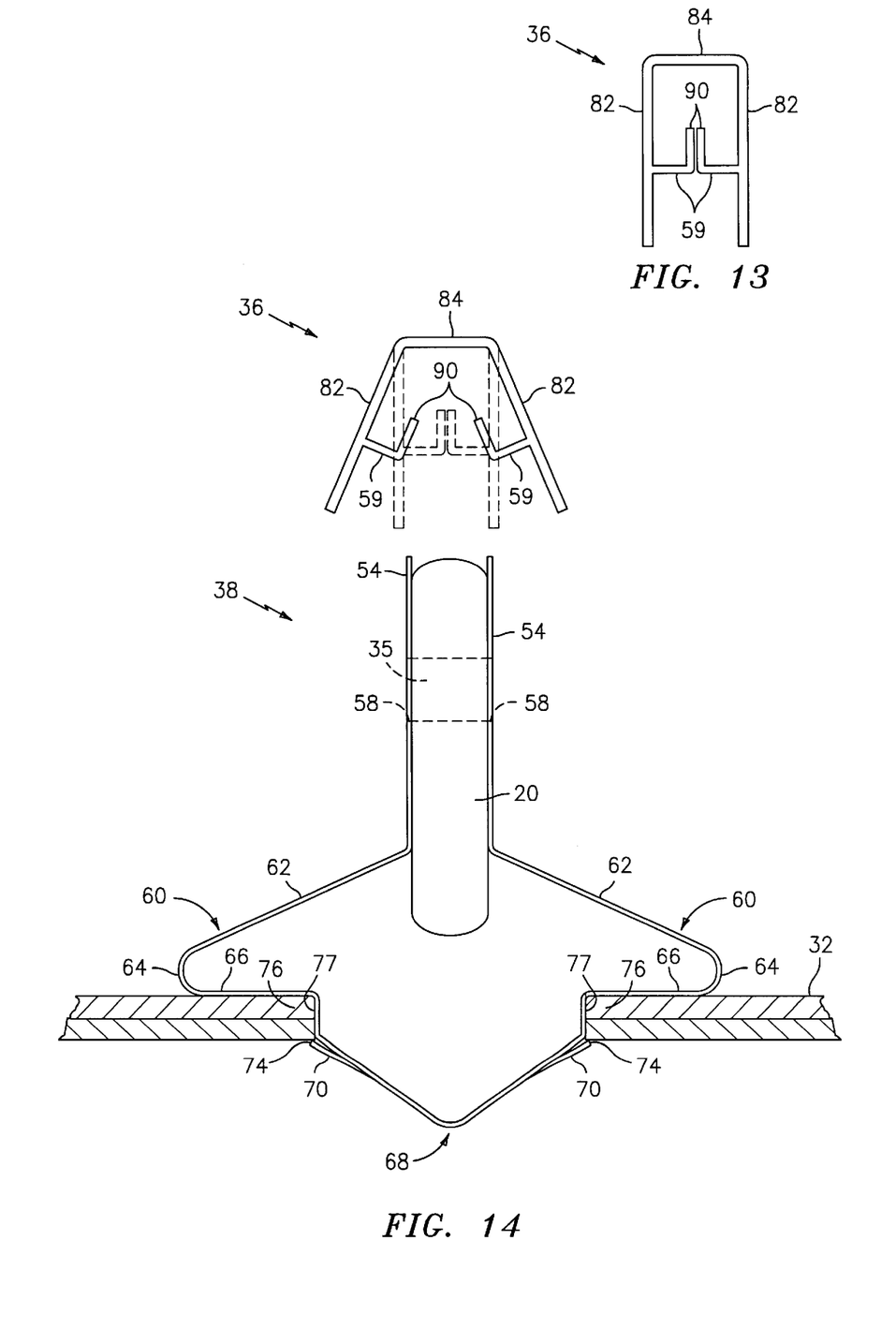
FIG. 13 is a front elevation view of an alternative embodiment of the FIG. 9 embodiment.
FIG. 14 is a front elevation view of the FIG. 13 embodiment being mounted to the connection assembly assembly.
Figure 15:
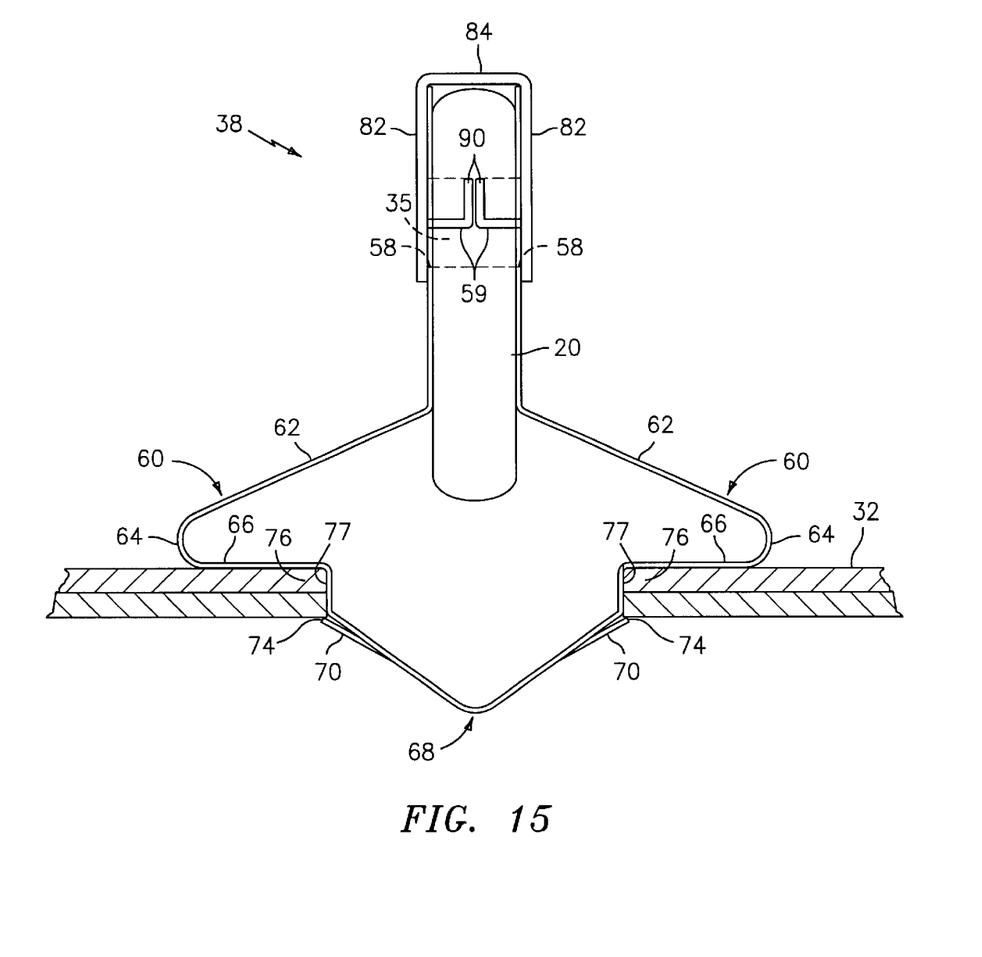
FIG. 15 is a front elevation view of the FIG. 13 embodiment secured to the connection assembly.

As an alternative, and referring now to FIGS. 13–15, retaining clip 36 is configured to have restraining tabs 59 which depend inwardly towards each other and are configured to each have a portion 90 extending towards top portion 84. Referring specifically to FIG. 14, retaining clip 36 is outwardly deformed (the original relaxed shape shown by phantom lines) to allow retaining clip 36 to be placed over planar members 54 of surface mount clip 34 having ground bus bar 20 inserted therebetween. Retaining clip 36 is outwardly deformed such that enough clearance is provided to allow upwardly extending portions 90 can be inserted over planar members 54.

When retaining clip 36 is positioned so that restraining tabs 59 and portions 90 are aligned with lock apertures 58, the outward force causing the outward deformation is released and retaining clip 40 reforms, as shown in FIG. 15. Portions 90 generally come together and the distal ends secure ground bus bar 20. Accordingly, ground bus bar 20 is fixedly secured to surface mount clip 34, and is precluded from vertical displacement.

The invention herein facilitates assembly of motor control centers by providing a fast and effective securement means for a ground bus bar 20. Wing plate 18 having planar surface 26 may be fabricated by known means, wherein a plurality of openings 40 are provided. Openings 40 may be provided during the fabrication of wing plate 18, therefore may be accurately positioned so as to ensure that ground bus bar 20 can be installed without modification. Furthermore, apertures 35 can be provided upon ground bus bar 20 during fabrication thereby ensuring accurate spacing corresponding to the openings 40.

A human or mechanically controlled device can quickly insert several surface mount clips 34 within openings 40. Ground bus bar 20 is then inserted within receiving areas 56 of surface mounts 34 and aligned so that apertures 35 align with lock apertures 58. The corresponding retaining clips 36 are secured to surface mounts 34 so that ground bus bar 20 is retained within planar members 54. Since a ground bus bar 20 may be installed without the need for special tooling or additional hardware, assembly time and expense is decreased.

A very reliable attachment can be effectuated by using the assembly of the present invention. The attachment of surface mount clips 34 to planar surface 26 is resistant to toppling, disengagement or loosening. Furthermore, the securement of retaining clips 36 to surface mount clips 34 effectively prevents ground bus bar 20 from being displaced from surface mounts 34.

Moreover, and as applications require, retaining clip 36 and surface mount clip 34 allow for ground bus bar 20 to be repositioned as opposed to configurations where ground bus bar 20 is welded or screwed to wing plate 18.

It is contemplated that the arrangement of openings 40 may readily be varied. For example, if it is desired to install ground bus bar 20 horizontally or diagonally, openings 40 may be provided to allow surface mount clips 34 to maintain ground bus bar 20 in the desired position.

It is also contemplated that, although the invention has been described herein with respect to ground bus bars and other conducting members, the securement assembly including surface mount clips 34 and retaining clips 36 may be employed to secure a non-conducting member such as plastic or wood to a surface.

While the invention has been described with reference to exemplary preferred embodiments, it will be understood by those skilled in the art that various changes may be made and equivalents may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A securement assembly, comprising:
   at least one mounting member being configured to be frictionally engaged within at least one opening in a planar surface, said mounting member being configured to have a pair of a planar members in a facing spaced relationship so as to define a first receiving area, said planar members each having an opening disposed thereon;
   a member having at least one opening, said member being received within said first receiving area and said at least one opening of said member aligning with said openings of said planar members;
   at least one securing member having an upper portion and a pair of sidewalls depending downwardly from said upper portion, said sidewalls being in a facing spaced relationship so as to define a second receiving area; and
   a pair of engagement members depending outwardly from said sidewalls into said second receiving area, said engagement members frictionally engaging said member opening within said first receiving area with said securing member positioned over a portion of said mounting member.

2. The securement assembly of claim 1, wherein said mounting member further includes an insertion portion configured for being inserted into said at least one opening of said planar surface.

3. The securement assembly as in claim 2, wherein said insertion portion has a frusto conical shape.

4. The securement assembly as in claim 3, wherein said pair of engagement members depend outwardly from said insertion portion, said pair of engagement members being angularly displaced from said insert portion and having a bias generally in the direction away from the surface of said insertion portion.

5. The securement assembly as in claim 4, wherein the positioning of said pair of engagement members causes said pair of engagement members to be engaged by said at least one opening of said planar surface.

6. The securement assembly as in claim 3, wherein said pair of engagement members depend outwardly from said insert portion, said pair of engagement members being angularly displaced from said insert portion and are configured to pivot within a range defined by a first position and a second position with respect to said insert portion.

7. The securement assembly as in claim 6, wherein said pair of engagement members are biased generally in first direction, said first direction being generally away from the surface of said insert portion.

8. The securement assembly as in claim 6, wherein said pair of engagement members contact said opening in said first position.

9. A securement assembly as in claim 8, wherein said pair of engagement members do not contact said at least one opening of said planar surface in said second position.

10. The securement assembly as in claim 9, wherein said pair of engagement members are biased in a direction opposite to said first direction as said insert portion of said mounting member is positioned through said opening in said surface, said pair of engagement members are biased in said first direction after said insert portion of said mounting member positioned past said at least one opening in said planar surface.

11. The securement assembly as in claim 8, wherein a pair of receiving areas are defined and positioned intermediate said insertion member and said mounting member, said pair of receiving areas receive and engage said planar surface.

12. The securement assembly as in claim 11, wherein said pair of receiving areas are further defined by said pair of engagement members.

13. The securement assembly as in claim 8, wherein said pair of engagement members are a pair of tabs, said tabs being stamped out of said insertion portion.

14. The securement assembly as in claim 11, wherein said pair of receiving areas are further defined by an engagement surface, said engagement surface contacts said at least one opening of said planar surface after said insertion portion is passed through said at least one opening of said planar surface.

15. The securement assembly of claim 1, wherein said member is an electrical conducting member.

16. A securement assembly, comprising:
   a plurality of mounting members being configured to be frictionally engaged within at least one opening in a planar surface, said mounting members having a pair of planar members in a facing spaced relationship so as to define a first receiving area, said planar members each having an opening disposed thereon;
   a member having a plurality of openings, said member being received within said first receiving area and said plurality of openings of said member aligning with said openings of said planar members;
   a plurality of securing members having an upper portion and a pair of sidewalls depending downwardly from said upper portion, said sidewalls being in a facing spaced relationship so as to define a second receiving area; and
   a pair of engagement members depending outwardly from said sidewalls into said second receiving area, said engagement members frictionally engaging said member opening within said first receiving area with said securing members positioned over a portion of said mounting members.

17. An assembly for retaining a bus bar to a surface, the assembly comprising:
  a plurality of surface mounts configured for insertion within a plurality of openings in said surface, said plurality of surface mounts each include a receiving portion having planar members that releasably retains said busbar intermediate said planar members; and
  a plurality of retaining clips each retaining clip extending from a first planar member to a second planar member, and said each retaining clip including a tab extending through said first planar member into an aperture disposed in said bus bar to prevent rotation and translation of said bus bar relative to a longitudinal axis of said bus bar.

18. The assembly of claim 17, wherein said plurality of surface mounts each include a snap fit engagement with each opening of said plurality of openings in said surface.

19. The assembly of claim 17, wherein said each retaining clip includes a second tab extending through said second planar member into said aperture.

20. The assembly of claim 18, wherein said plurality of surface mounts each include a conically shaped portion configured for being inserted within said plurality of openings.

21. The assembly of claim 20, wherein said plurality of surface mounts each has a pair of retaining tabs configured to provide an interference engagement with said surface.

22. A motor control center comprising:
  an enclosure, said enclosure including a surface having an opening disposed therein;
  a bus bar; and an assembly for retaining said bus bar on said surface, said assembly including
    a surface mount disposed in said opening, said surface mount including a receiving portion having planar members that accept and retain said bus bar intermediate said planar members; and
    a retaining clip for securing said bus bar to said surface mount.

23. A method of securing a member having an opening to a surface having an opening, the method comprising:
  inserting a mounting member into said opening of said surface;
  frictionally engaging said mounting member with said opening of said surface, said mounting member having a pair of a planar members in a facing spaced relationship configured to accept said member, said planar members defining a first receiving area, said planar members each having an opening disposed thereon;
  inserting said member in said first receiving area and aligning said opening of said member with each said opening of said planar members;
  inserting a securing member over a portion of said mounting member;
  securing member having an upper portion and a pair of sidewalls depending downwardly from said upper portion, said sidewalls being in a facing spaced relationship defining a second receiving area, and said sidewalls including a pair of engagement members depending outwardly into said second receiving area; and
  aligning said pair of engagement members with said opening of said member and each said opening of said planar members until said engagement members frictionally engage said member within said first receiving area.

* * * * *